March 23, 1943.                J. H. HOLSTEIN                2,314,786
                               SHAKER CONVEYER
                             Filed June 6, 1941            2 Sheets-Sheet 1

INVENTOR
John H. Holstein
BY
Clarence F. Poole
ATTORNEY

March 23, 1943.                J. H. HOLSTEIN                2,314,786
                               SHAKER CONVEYER
                             Filed June 6, 1941           2 Sheets-Sheet 2
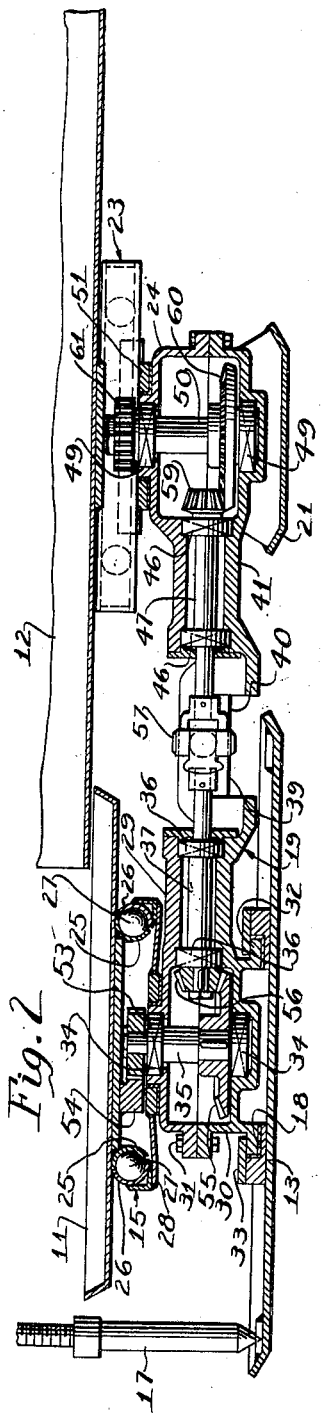
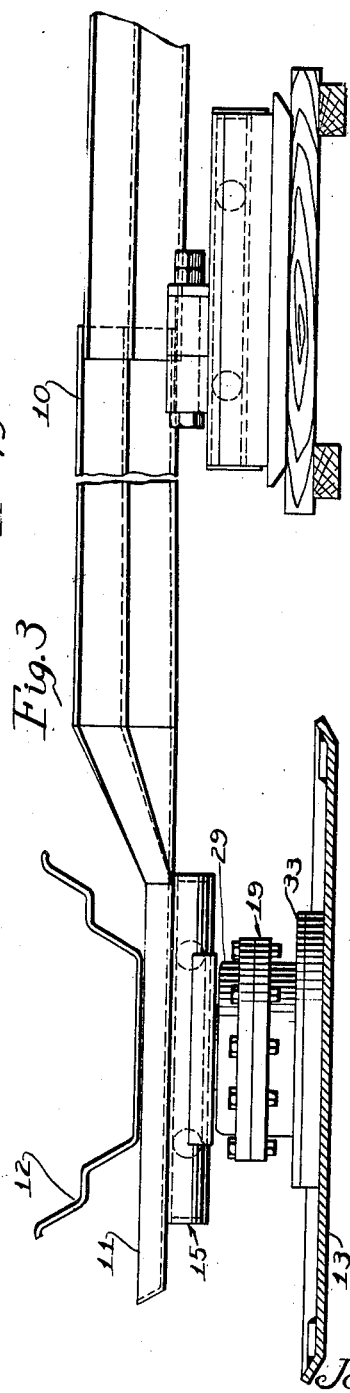
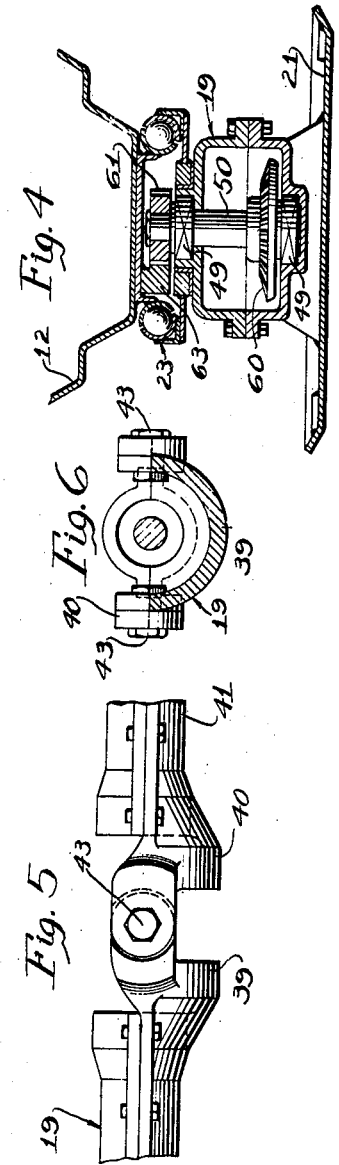
INVENTOR
John H. Holstein
BY
Clarence F. Poole
ATTORNEY Patented Mar. 23, 1943

2,314,786

UNITED STATES PATENT OFFICE 2,314,786

SHAKER CONVEYER

John H. Holstein, Chicago, Ill., assignor to Goodman Manufacturing Company, Chicago, Ill., a corporation of Illinois Application June 6, 1941, Serial No. 396,834

15 Claims. (Cl. 198—220)

This invention relates to improvements in shaker conveyers, and more particularly relates to an improved means for driving one trough section of a shaker conveyer from another when the driven trough section is horizontally displaced with respect to the driving trough section.

The principal objects of my invention are to provide a new and improved means of a simplified arrangement for reciprocably driving one trough section of the conveyer from another, when horizontally displaced with respect to the driving trough section, which drive means is adjustable to permit a wide variation in the angles of displacement of the trough sections with respect to each other.

A more specific object of my invention is to provide a means for driving one trough section of a shaker conveyer from another when said trough sections are disposed at varying angles with respect to each other, which includes a link holding said trough sections in spaced relation with respect to each other, drive means extending parallel to said link, a geared drive connection from one trough section to said drive means, for reciprocably driving said drive means, and a geared drive connection from the opposite end of said drive means, for reciprocably driving said other trough section therefrom.

Other objects of my invention will appear from time to time as the following specification proceeds and with reference to the accompanying drawings wherein:

Figure 2 is a sectional view taken substantially along line 2—2 of Figure 1 and drawn to a slightly reduced scale;

Figure 3 is an end view showing the discharge point from one trough section to the other;

Figure 4 is a transverse sectional view taken substantially along line 4—4 of Figure 1;

Figure 5 is an enlarged detail view showing certain details of the connecting link for the two trough sections; and Figure 6 is a transverse sectional view taken through said connecting link.

Figure 1:
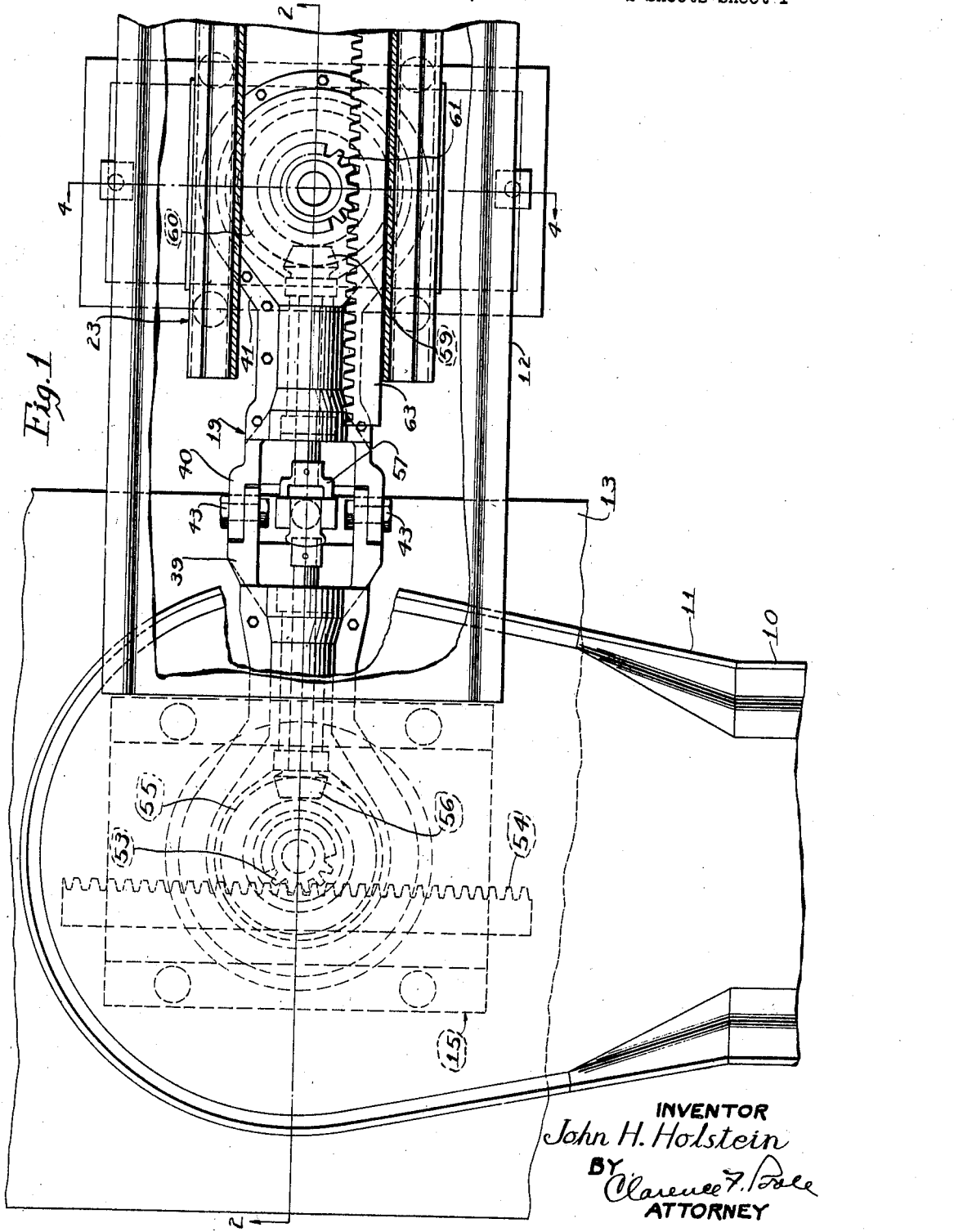
Figure 1 is a top plan view of adjacent ends of two shaker conveyer trough sections, with certain parts of one of the trough sections broken away, in order to show certain details of the drive means from one trough section to the other.

Referring now in particular to the embodiment of my invention illustrated in the drawings, a reciprocating trough section 10 is provided. Said trough section has a widened forward or receiving end 11 adapted to be overlapped by the discharge end of a trough section 12, arranged to discharge material into said widened forward end. Either the trough section 10 or the trough section 12 may be reciprocably driven from a suitable shaker conveyer drive mechanism (not shown), although in the form of my invention herein shown the trough section 12 is horizontally adjustable about the trough section 10, so it is preferable to drive the trough section 10 from said shaker conveyer drive mechanism.

A base 13 is provided at the forward end of the trough section 10 and has said trough sections reciprocably mounted thereon, on a ball frame 15. Said base is adapted to be held stationary on the ground by means of jacks 17, 17, adapted to be interposed between said base and the mine roof, and is provided with an annular bearing 18 adapted to form a bearing for a connecting link 19, for mounting said connecting link for pivotal movement about a vertical axis. Said connecting link forms a housing and bearing support for the gearing for driving one trough section from the other and is transversely pivoted intermediate its ends, in a manner which will hereinafter more clearly appear as this specification proceeds. The end of said link opposite said base is mounted on a shoe 21, which is herein shown as being formed integral therewith. Suitable jacks (not shown) may be provided to hold said shoe stationary during operation of the conveyer. The trough section 12 is mounted on said link, just above said shoe, for slidable movement with respect thereto, on a ball frame 23, journaled on the upper side of an upper housing portion 24 of said link. Said trough section may thus be pivotally moved with respect to said link about a vertical axis.

The ball frame 15 is of a usual construction and is herein shown as comprising a pair of laterally spaced upper races 25, 25, secured to the bottom of the receiving end 11 of the trough section 10 and extending longitudinally therealong, and slidably mounted on a pair of corresponding facing lower races 26, 26 by means of balls 27, 27. Said lower races are mounted on a frame member 28, which is vertically pivoted on an upper housing portion 29 of the link 19. The ball frame 23 is of the same construction as the ball frame 15, so need not herein be described in detail.

The upper housing portion 29 of the connecting link 19 is secured to a lower housing portion 30 thereof by means of suitable nuts and bolts 31, 31. Said lower housing portion is provided with a flanged lower end 32, journaled in the annular bearing 18. A retaining ring 33 abuts the upper side of said flanged portion 32. Said upper and lower housing portions of said link form mountings for bearings 34, 34, for a vertical shaft 35. They also form mountings for bearings 36, 36, for a horizontal shaft 37.

The lower housing portion 30 of said link is provided with an outer end 39 which is of a bifurcated formation, to which is transversely pivoted an inner bifurcated end 40 of an outer portion 41 of said link, which outer portion forms a lower housing for the gearing for reciprocably driving the trough section 12 and which is herein shown as being formed integral with the shoe 21. Pivotal pins 43, 43, having heads on one end thereof and nuts threaded on their opposite ends, are provided to form a means for pivotally connecting said bifurcated portions of said link together. The shoe 21 may thus swing about the base 13, about a vertical axis coaxial with the vertical shaft 35, and said base may move vertically with respect to said first mentioned base, to conform to an uneven mine bottom.

The outer housing portion 41 of the connecting link 19 and the upper housing portion 24, mounted thereon, form bearing supports for ball bearings 46, 46 for a longitudinal shaft 47 and also form bearing supports for ball bearings 49, 49 for a vertical shaft 50, which vertical shaft is coaxial with the axis of pivotal connection of the ball frame 23 to the outer end of said link. As herein shown, said ball frame is journaled on an annular shouldered bearing portion 51 of said upper housing.

Referring now in particular to the geared drive connection, for reciprocably driving the vertical shaft 50 from the vertical shaft 35, a spur pinion 53 is keyed on the upper end of said vertical shaft and is meshed with a rack 54 extending longitudinally along the bottom of the receiving end 11 of the trough section 10. Said rack is secured to said bottom in a suitable manner, such as welding. A bevel gear 55 is keyed on said shaft, just above the lower bearing 34, and meshes with and drives a bevel pinion 56 on the inner end of the horizontal shaft 37. A universal coupling 57 connects the outer end of the shaft 37 with the inner end of the shaft 47 so that one of said shafts may drive the other when the shoe 21 is in various positions of vertical displacement with respect to the base 13. A bevel pinion 59 is keyed on the opposite end of the shaft 47 and drives a bevel gear 60, keyed on the vertical shaft 50, and disposed just above the lower bearing 49. A spur pinion 61 is keyed on the upper end of said shaft and meshes with a rack 63 extending longitudinally of the trough section 12 and mounted on the bottom thereof, in a suitable manner, such as welding.

It may be seen from the foregoing that upon reciprocable movement of the trough section 10, the rack 54 will oscillatively drive the spur pinion 53, which in turn will drive the spur pinion 61 and rack 63 through the bevel gears 55, 56, shaft 37, universal coupling 57, shaft 47, bevel gears 59 and 60, and vertical shaft, 50, and that said last mentioned spur pinion 61 may be oscillatively driven from said first mentioned spur pinion 53 when the shoe and trough section 12 are in various positions with respect to the base 13 and the receiving end 11 of the trough section 10.

It may also be seen that a simple and improved form of drive connection, for driving one trough section of a shaker conveyer from another, has been provided, which permits the swinging of one trough section with respect to the other about a vertical axis and which forms a drive means for the other trough section when it is in various positions of adjustment with respect to said first mentioned trough section.

It may further be seen that such a drive connection is particularly advantageous where it is desired to extend one trough section through a breakthrough at right angles with respect to the main trough line of the conveyer, or to a far corner of the working place, and is also advantageous where it is desired to provide a pick-up device on the forward end of the swinging trough section, for picking up material from the ground from either rib of the working place.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an angle drive for reciprocably driving one trough section of a shaker conveyer from another, a base having one trough section reciprocably mounted thereon, another base adjustably movable about said first mentioned base and having said other trough section reciprocably mounted thereon, a link pivotally connected to one of said bases and holding said bases in fixed spaced relation with respect to each other during movement of one base about the other, drive means extending parallel to said link, a geared drive connection from one of said trough sections to said drive means and a geared drive connection from said drive means to said other trough section.

2. In an angle drive for reciprocably driving one trough section of a shaker conveyer from another, a base having one trough section reciprocably mounted thereon, another base adjustably movable about said first mentioned base and having said other trough section reciprocably mounted thereon, a link pivotally connected to one of said bases and holding said other base in fixed spaced relation with respect to said first mentioned base during movement of one base about the other, drive means extending parallel to said link, a geared drive connection from one of said trough sections to said drive means including a rack on said trough section, a pinion meshing therewith and a bevel geared drive connection from said pinion to said drive means, and a rack and pinion for reciprocably driving said other trough section from said drive means.

3. In an angle drive for a shaker conveyer, a pair of trough sections arranged at horizontal angles with respect to each other, a pinion oscillatively driven by one trough section, another pinion forming a means for reciprocably driving another trough section, and geared drive connections from one of said pinions to the other, for oscillatively driving said other pinion when said trough sections are in various horizontal positions of adjustment with respect to each other.

4. In an angle drive for reciprocably driving one trough section of a shaker conveyer from another, a rack reciprocated by one trough section, a pinion meshing with said rack and oscillatively rotated thereby, a rack on the other trough section, a pinion meshing therewith for reciprocably moving said rack and other trough section, and a geared drive connection from one pinion to the other for driving said second mentioned pinion from said first mentioned pinion when said trough sections are in various horizontal positions of adjustment with respect to each other.

5. In an angle drive for reciprocably driving one trough section of a shaker conveyer from another, a pinion oscillatively driven by one trough section, another pinion forming a means for reciprocably driving another trough section, and a bevel geared drive connection from said first mentioned pinion to said second mentioned pinion, for driving said second mentioned pinion when said trough sections are in various angular positions of adjustment with respect to each other.

6. In an angle drive for a shaker conveyer, a pair of trough sections arranged at horizontal angles with respect to each other, a rack reciprocated by one trough section, a pinion meshing with said rack and oscillatively rotated thereby, a rack on said other trough section, a pinion meshing therewith for reciprocably driving said rack and other trough section, and a bevel geared drive connection between said pinions, for driving one of said pinions from the other when said trough sections are in various positions of adjustment with respect to each other.

7. In a shaker conveyer, a reciprocably driven trough section, another trough section arranged in cascade relationship with respect to said first mentioned trough section and mounted for movement about said first mentioned trough section about a vertical axis, and a drive connection from one of said trough sections to the other, for driving said other trough section in all positions of said trough sections with respect to each other including a gear driven by one of said trough sections, another gear, for reciprocably driving said other trough section, and a geared drive connection between said gears.

8. In a shaker conveyer, a pair of shaker conveyer trough sections arranged in cascade relationship with respect to each other, one of said trough sections being movable about said other trough section about a vertical axis, and a drive connection from one of said trough sections to the other, for driving said other trough section in all positions of said trough sections with respect to each other including a gear driven by one of said trough sections, another gear for reciprocably driving said other trough section, and a bevel geared drive connection between said gears.

9. In a shaker conveyer, a pair of conveyer trough sections arranged in cascade relationship with respect to each other, one of said trough sections being movable about said other trough section about a vertical axis, and a drive connection from one of said trough sections to the other, for driving said other trough section in all positions of said trough sections with respect to each other including a rack on one of said trough sections, a gear driven thereby, a rack on said other trough section, a gear for reciprocably driving said rack, and a geared drive connection between said gears including a bevel gear arranged coaxial with the axis of turning movement of one trough section with respect to the other.

10. In a shaker conveyer, a base, a conveyer trough section mounted on said base for reciprocable movement with respect thereto, another base, a conveyer trough section mounted on said base for reciprocable movement with respect thereto, a link connecting said second base with said first base for pivotal movement about a vertical axis spaced from said second base, and means driven by one of said trough sections for reciprocably driving the other trough section when said bases are in various angular positions of adjustment with respect to each other including a gear oscillatively driven by one of said trough sections, a shaft journaled in said link and driven by said gear at one of its ends, a gear for reciprocably driving said other trough section, and a drive connection from the opposite end of said shaft to said gear.

11. In a shaker conveyer, a base, a conveyer trough section mounted on said base for reciprocable movement with respect thereto, another base, a conveyer trough section mounted on said other base, for reciprocable movement with respect thereto, a link holding said bases in spaced apart relation with respect to each other and having vertical pivotal connection with one of said bases, a bevel gear journaled in said link, adjacent one end thereof, another bevel gear journaled in said link adjacent the opposite end thereof, a horizontal shaft journaled in said link, for driving one bevel gear from the other, a drive from one trough section to one bevel gear and a drive from the other bevel gear to the other trough section.

12. In a shaker conveyer, a base, a conveyer trough section mounted on said base for reciprocable movement with respect thereto, another base, a shaker conveyer trough section mounted on said other base for reciprocable movement with respect thereto, a link holding said bases in spaced apart relation with respect to each other and having vertical pivotal connection with one of said bases, said link being transversely pivoted intermediate its ends to permit one base to move vertically with respect to the other, a pair of shafts journaled in said link and connected together so one will drive the other when one portion of said link is transversely pivoted with respect to the other, a geared drive connection from one of said trough sections to one of said shafts and a geared drive connection from said other shaft to said other trough section.

13. In a shaker conveyer, a base, a conveyer trough section mounted on said base for reciprocable movement with respect thereto, another base, a shaker conveyer trough section mounted on said other base for reciprocable movement with respect thereto, a link holding said bases in spaced apart relation with respect to each other and having vertical pivotal connection with one of said bases, said link being transversely pivoted intermediate its ends to permit one base to move vertically with respect to the other, a pair of shafts journaled in said link and connected together so one will drive the other when one portion of said link is displaced with respect to the other in a vertical plane, a geared drive connection from one of said trough sections to one of said shafts including a rack and pinion, and a rack reciprocably driven from the free end of said other shaft, for reciprocably driving said other trough section.

14. In a shaker conveyer, a base, a conveyer trough section mounted on said base for reciprocable movement with respect thereto, another base, a conveyer trough section mounted on said other base for reciprocable movement with respect thereto, a link transversely pivoted intermediate its ends and having vertical pivotal connection with one of said bases, for holding said bases in spaced apart relation with respect to each other, a pair of shafts journaled in said link, a universal coupling connecting said shafts together so one will drive the other when one portion of said link is transversely pivoted with respect to the other, a rack on one of said trough sections, a gear concentric with the axis of pivotal connection of said link to one of said bases, and oscillatively driven by said rack, a geared drive connection between said gear and one of said shafts, for driving said shaft in all positions of said link with respect thereto, a rack on said other trough section, a gear meshing therewith, and a geared drive connection from the free end of the other shaft, for driving said gear.

15. In a shaker conveyer, a base, a conveyer trough section mounted on said base for reciprocable movement with respect thereto, another base, a conveyer trough section mounted on said base for reciprocable movement with respect thereto, a link transversely pivoted intermediate its ends and having vertical pivotal connection with one of said bases, for holding said bases in spaced apart relation with respect to each other, a pair of shafts journaled in said link, a universal coupling connecting said shafts together, a rack on one of said trough sections, a gear concentric with the axis of pivotal connection of said link to said base, associated with one trough section and oscillatively driven by said rack, a bevel gear and pinion journaled in said link and serving to drive said shaft from said gear, a rack on said other trough section, a gear meshing therewith and a bevel gear and pinion journaled in said link and driven from the free end of said other shaft, for driving said other gear and rack.

JOHN H. HOLSTEIN.